(12) United States Patent
Shimozono

(10) Patent No.: US 8,833,874 B2
(45) Date of Patent: Sep. 16, 2014

(54) RUBBER TRACK

(75) Inventor: Nobuo Shimozono, Zushi (JP)

(73) Assignee: Bridgestone Corporation, Tokyo (JP)

( * ) Notice: Subject to any disclaimer, the term of this patent is extended or adjusted under 35 U.S.C. 154(b) by 810 days.

(21) Appl. No.: 12/992,134

(22) PCT Filed: Jun. 3, 2009

(86) PCT No.: PCT/JP2009/060153
§ 371 (c)(1),
(2), (4) Date: Jan. 21, 2011

(87) PCT Pub. No.: WO2009/148080
PCT Pub. Date: Dec. 10, 2009

(65) Prior Publication Data
US 2011/0163596 A1 Jul. 7, 2011

(30) Foreign Application Priority Data

Jun. 3, 2008 (JP) .................................. 2008-145559

(51) Int. Cl.
*B62D 55/24* (2006.01)
(52) U.S. Cl.
CPC .............. *B62D 55/24* (2013.01); *B62D 55/244* (2013.01)
USPC ............................ 305/167; 305/171; 305/177
(58) Field of Classification Search
USPC .................. 305/165, 167, 170–177
See application file for complete search history.

(56) References Cited

U.S. PATENT DOCUMENTS

| | | | | |
|---|---|---|---|---|
| 5,522,655 A | * | 6/1996 | Katoh | 305/174 |
| 6,106,083 A | * | 8/2000 | Ono | 305/171 |
| 6,474,755 B1 | * | 11/2002 | Pringiers | 305/171 |
| 7,044,567 B2 | * | 5/2006 | Ishibashi | 305/167 |
| 2002/0163252 A1 | * | 11/2002 | Tsuru | 305/167 |
| 2004/0224118 A1 | * | 11/2004 | Tsuru | 428/58 |
| 2006/0061212 A1 | * | 3/2006 | Uchiyama | 305/167 |
| 2009/0302677 A1 | * | 12/2009 | Sugihara | 305/171 |

FOREIGN PATENT DOCUMENTS

| | | |
|---|---|---|
| EP | 0 895 924 A2 | 2/1999 |
| JP | 2001-322578 A | 11/2001 |
| JP | 2003-335275 A | 11/2003 |
| JP | 2005-1432 A | 1/2005 |
| JP | 2006-151347 A | 6/2006 |
| JP | 2008-94240 A | 4/2008 |

OTHER PUBLICATIONS

Chinese Office Action issued in corresponding Chinese Application No. 200980120528.X dated Jun. 19, 2012.

(Continued)

*Primary Examiner* — Glenn Dayoan
*Assistant Examiner* — Jason S Daniels
(74) *Attorney, Agent, or Firm* — Sughrue Mion, PLLC

(57) ABSTRACT

An endless rubber elastic body 1; a plurality of cores 2 arranged at predetermined pitches and extending in a width direction of the rubber elastic body; a steel cord reinforcing layer surrounding the cores; and a lug 4 formed on an outer peripheral surface of the rubber elastic body 1 at predetermined intervals. Thicknesses of respective end portions of each core 2 are gradually decreased or made constant toward respective end edges. A covering thickness t1, t2 of rubber elastic body 1 is thicker at a portion between lugs on each of an inner and outer peripheral surface side than covering thickness T1, T2 of the rubber elastic body. Covering surfaces on both inner and outer peripheral surface sides are flat.

3 Claims, 5 Drawing Sheets

(56) References Cited

OTHER PUBLICATIONS

European Office Action issued in European Application No. 09758347.0 dated Sep. 5, 2012.
Japanese Office Action, dated Feb. 19, 2013, issued in corresponding Japanese Patent Application No. 2008-145559.
International Search Report dated Jul. 21, 2009 (2 pages).
Japanese Office Action dated Oct. 2, 2012 issued in Japanese Patent Application No. 2008-145559.
Extended European Search Report issued in the corresponding European Application No. 09758347.0 dated Sep. 29, 2011.
Japanese Office Action issued in Japanese Application No. 2008-145559 dated Jul. 2, 2013.

* cited by examiner

FIG. 5
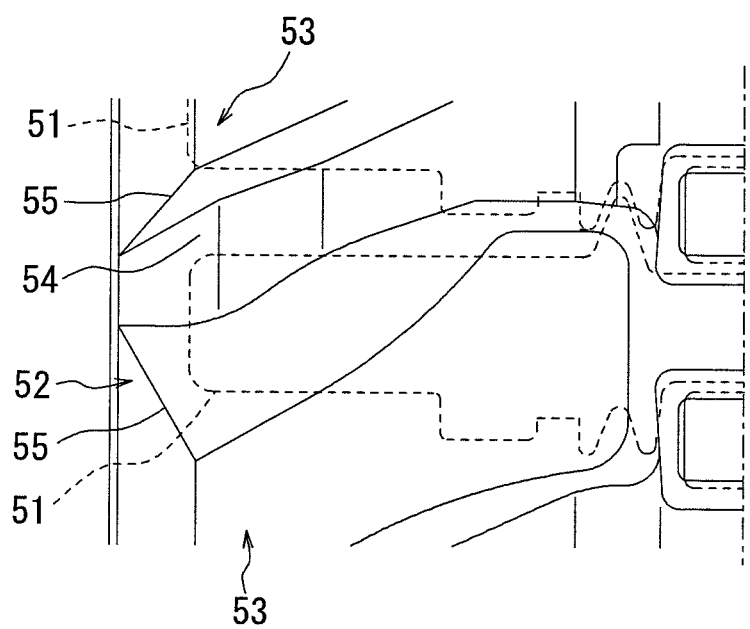
(a)
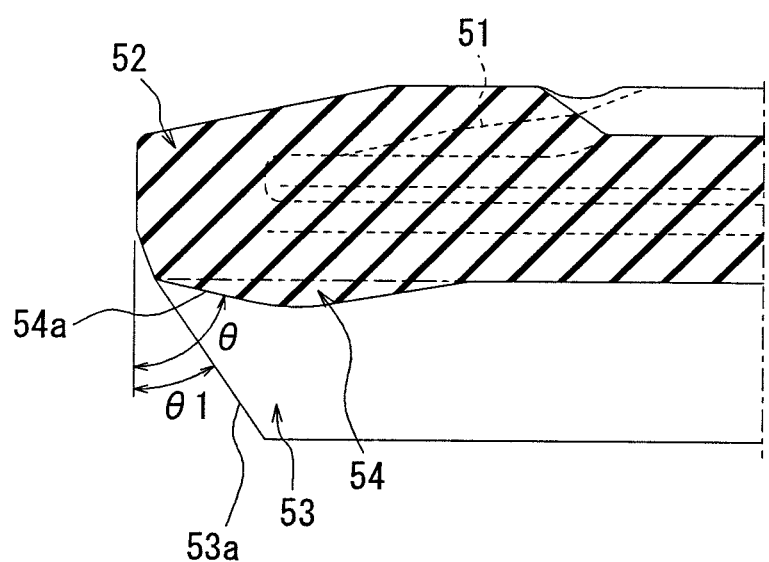
(b)

RUBBER TRACK

TECHNICAL FIELD

The present invention relates to a rubber track having an endless rubber elastic body; plural cores arranged at predetermined pitches within the rubber elastic body so as to extend in the width direction of the rubber elastic body; a steel cord reinforcing layer surrounding the cores and extending in the rubber elastic body; and plural lugs formed on the outer peripheral surface of the rubber elastic body at predetermined intervals and acting on a road surface. In particular, the present invention proposes a technique that effectively prevents occurrence of cracks at the rubber elastic body of the rubber track covering end portions of the respective cores.

BACKGROUND ART

For example, in a so-called short-pitch-type rubber track for construction machines in which plural cores are arranged at short pitches, when lugs are arranged on the outer peripheral surface of the rubber track in consideration of cut resistance or vibration reducing property, an end portion of one core among two cores adjacent to each other in the circumferential direction is likely to become a portion not covered with the lug. As a result, at a portion of the end portion of the core not covered with the lug, a covering thickness of the core covered with the rubber elastic body is thinner, which leads to a large stepwise difference in rigidity between a portion with the core and a portion without the core. Therefore, there existed a problem that, when the rubber track travels, strain is concentrated between these portions, and cracks called an edge-cutting are likely to occur at the portion corresponding to the end portion of the core of the rubber elastic body.

To solve such a problem as this, Patent Literature 1 proposes that a ridge 54 extending between lugs 53 located before and after the ridge 54 be formed on the outer peripheral surface of a rubber elastic body 52 and at portions corresponding to right and left end portions of a core 51, as exemplarily shown in FIG. 5, which relates to a developed plan view and a sectional view in the width direction on the outer peripheral surface side of the half width of a rubber track. With this technique, since the ridge 54 is formed on the outer peripheral surface of the rubber elastic body 52 and at the portions corresponding to the right and left ends of the core 51 where the edge-cuttings are most likely to occur, the strain occurring at the right and left ends of the core is made dispersed, and the occurrence of cracks at the rubber elastic body 52 can be prevented.

However, as can be clearly understood from the sectional view exemplarily shown in FIG. 5(b), with the proposed technique, an inclined angle θ of an inclined plane 54a of the ridge 54 whose thickness gradually decreases toward the side edge side of the rubber elastic body 52, with respect to a vertical plane is significantly large as compared with a similar inclined angle θ1 of an inclined face 53a of each of the lugs 53 on the side edge side of the rubber elastic body. Therefore, even at the portion where the ridge 54 is formed, the thickness of the rubber covering the end portion of the core 51 is significantly small as compared with that at the lug 53, and hence, the crack directly occurring at a portion of the rubber elastic body 52 corresponding to the end edge of the core 51 still cannot be sufficiently prevented when the side edge of the rubber track is rubbed with a curbstone or the like. Further, because of the difference between the inclined angles θ, θ1 described above, a spur 55 formed by an angled portion adjacent to the inclined face 53a of the lug 53 is made outstanding throughout the entire length thereof. The spur 55 is likely to be caught by the curbstone or the like, which causes the strain to be concentrated on the portion corresponding to the end edge of the core. This further promotes the occurrence of cracks at the rubber elastic body 52 as described above.

Further, for the similar purpose of preventing the occurrence of cracks, as described in Patent Literature 2, there is proposes a rubber track having cores arranged at predetermined pitches and covered with a rubber body portion, in which the wall thickness of the rubber body portion at an end portion in the width direction of the rubber track is substantially equal in all the directions of an inner peripheral side, outer side and outer peripheral side from the end portion of the core. According to this proposal, even when forces from any direction act on the end portion of the rubber track due to riding over obstacles, and the like, the wall thickness between the end portion of the rubber track and the end portion of the core of the rubber body portion is substantially equal, and hence, stress concentration is less likely to occur. As a result, there is no possibility of occurrence of the edge-cuttings and the like, whereby durability of the rubber track improves.

However, with the rubber track described in Patent Literature 2, there is a problem that a side portion of the track is brought into point-contact with a curbstone in a case where the side portion is formed into an outwardly-convex curved shape, and hence, cracks due to the stress concentration are more likely to occur at the side portion. Further, in a case where a side face of the track is formed into a flat face, the stress concentration is less likely to occur, but there arises a problem that it is difficult to secure the thickness of the rubber on the lug side sufficient to improve the crack resistance at the end of the core.

RELATED ART DOCUMENT

Patent Literatures

Patent Literature 1: JP 2005-1432 A
Patent Literature 2: JP 2001-322578 A

SUMMARY OF THE INVENTION

Problems to be Solved by the Invention

The present invention further improves the rubber track described in Patent Literatures 1 and 2, and can prevent occurrence of cracks at a portion of the rubber elastic body corresponding to an end edge, which is not covered with the lug, of the core extending in the width direction of the rubber elastic body. Further, the present invention provides a rubber track that can prevent the occurrence of the stress concentration even when a side portion of the track is strongly pressed against the curbstone or the like, and secure the thickness of the rubber on the road-contacting side so as to effectively improve the durability thereof against the occurrence of cracks at the end of the core.

Means for Solving the Problems

The present invention provides a rubber track having: an endless rubber elastic body; plural cores arranged at predetermined pitches within the rubber elastic body so as to extend in a width direction of the rubber elastic body; a steel cord reinforcing layer surrounding the cores and extending in the rubber elastic body; and a lug formed on an outer peripheral surface of the rubber elastic body at predetermined intervals and acting on a road surface, wherein both end portions of the cores, for example, a region extending from an end edge of the core to ¼ of a total length of the core are formed such that a thickness thereof gradually decreases toward the end edge of the core, or is constant up to the end edge of the core; at each end portion of the core, for example, a region extending from the end edge of the core to ½-⅓ of the above-described ¼ range, a covering thickness of the rubber elastic body at a portion between the lugs on each of the inner peripheral surface side and the outer peripheral surface side is formed 1.2 to 2 times thicker than a covering thickness of the rubber elastic body 1 at a point located ¼ of the core length from the end edge of the core; and, the covering surfaces on both the inner peripheral surface side and the outer peripheral surface side are formed into flat surfaces.

Note that the end portion of the cores may have a midsection-protruding shape such as a mount shape or a barrel shape in a cross section thereof. In this case, the covering thickness of the rubber elastic body at the end portion of the core as well as the covering thickness of the rubber elastic body at the point located ¼ of the length of the core from the end edge position of the core are formed so as to cover the peak of the midsection-protruding-shaped portion Here, the flat surfaces described above, into which the covering surfaces of the rubber elastic body at the end portion of the core are formed at a portion between the lugs on each of the inner peripheral surface side and the outer peripheral surface side, mean that a curved surface is excluded. Therefore, it is possible to shape the surfaces into an inclined surface, and more preferably, those flat surfaces are parallel to each other, in particular, are horizontal surfaces.

More preferably, an outer side edge of the steel cord reinforcing layer is located inside of an end position of the core in the width direction; a covering thickness of the rubber elastic body at the end portion of the core on the outer peripheral surface side is formed so as to be kept constant from the position of the outer side edge of the steel cord reinforcing layer up to the portion on the inner side in the width direction of the steel cord reinforcing layer; and, the covering thickness of the rubber elastic body is made gradually decreased toward the inner side in the width direction of the steel cord reinforcing layer from a position further inside of the above-described inner side portion in the width direction thereof.

In this case, it is preferable that the thicknesses of the covering rubber elastic body at the end of the core on the inner peripheral surface side and the outer peripheral surface side be decreased in a curved-surface manner in the widthwise inner side direction, or in a flat-and-inclined surface manner that connects through the curved surface with the thick wall portion and the thin wall portion, in order to alleviate the stress concentration caused by the deformation of the rubber elastic body to prevent the occurrence of cracks at the rubber elastic body.

Further preferably, the covering thickness of the rubber elastic body at the end portion of the core on the outer peripheral surface side, where the steel cord reinforcing layer extends, is made thicker than the covering thickness of the rubber elastic body at the end portion of the core on the inner peripheral surface side.

Effect of the Invention

According to the rubber track of the present invention, the thicknesses of both end portions of the core are made gradually thinner toward the end portion of the core, or are kept constant up to the end edge of the core, without applying any special edge-cutting preventative measure such as so-called overlaying, bending, and fringing to the end portion or end part of the core itself, that is, without causing the increase in the cost of the core. Further, the respective covering thicknesses of the rubber elastic body at the end portion of the core and between the lugs on the inner peripheral surface side and the outer peripheral surface side are formed, for example, 1.2 to 2 times thicker than a covering thickness of the rubber elastic body 1 at a point located ¼ of the core length from the end edge position of the core, and, the covering surfaces are formed into a flat surface on both the inner peripheral surface side and the outer peripheral surface side, in particular, the thickness of the rubber elastic body at the end portion of the core on the inner and the outer peripheral surfaces is increased, whereby a distance between the surface of the core and the surface of the rubber elastic body is made sufficiently large. With this configuration, the stress concentration on the rubber elastic body can be effectively prevented even when the rubber elastic body is largely deformed in the vicinity of the end portion of the core due to the effect of the external force to the rubber track. Consequently, the occurrence of cracks such as edge-cutting at the rubber elastic body can be effectively suppressed.

It should be noted that, in order to obtain the operation and effect as described above, it is preferable that the thickness of the rubber elastic body covering the end portion of the core be about 1.2 to 2 times with respect to the covering thickness of the rubber elastic body at the point located ¼ of the core length from the end edge position of the core, from the viewpoint of securing a required anti-bending property while securing an external damage resistance.

In the present invention, the inner and the outer covering surfaces of the rubber elastic body covering the end portion of the core are formed into the flat surfaces. The flat surface itself does not have any angled portion such as a bending portion, whereby the possibility of the occurrence of cracks at the rubber elastic body due to the stress concentration can be sufficiently removed even when the large deformation as described above occurs at the rubber elastic body. Further, at the time when the rubber track rides over curbstone or the like, or the rubber elastic body is brought into contact with other external interference objects, the rubber elastic body hits against them in a surface contact manner. This makes it possible to suppress the local bending deformation of the rubber elastic body, whereby all the problems of conventional techniques described in Patent Literatures 1 and 2 can be solved.

In the present invention, in a case where the covering surfaces of the rubber elastic body covering the inner and the outer peripheral surfaces at the end portion of the core is formed into parallel surfaces, the thickness of the rubber around the core can be uniform, whereby the increase in the vulcanizing time can be effectively prevented.

Further, in a case where the covering surfaces are horizontal surfaces parallel to each other, it is possible, on the lug side of the outer peripheral surface, to reduce the surface pressure at the time of contacting the curbstone, increase the external damage resistance and the anti-bending property, and enhance the traction performance. Also, on the inner peripheral surface side, the possibility of interference with the machine body can be largely decreased.

In the present invention, an outer side edge of the steel cord reinforcing layer is located inside of an end position of the core in the width direction; a covering thickness of the rubber elastic body at the end portion of the core on the outer peripheral surface side is formed so as to be kept constant from a position of the outer side edge of the steel cord reinforcing layer up to an inner side portion in the width direction of the steel cord reinforcing layer; and, the covering thickness of the rubber elastic body is gradually decreased from a further inner side portion than the above-described inner side portion toward the inner side in the width direction. With this configuration, first, since the outer edge of the steel cord reinforcing layer is located inside of the end position of the core, it is possible to advantageously prevent the rubber elastic body from receiving the local stress concentration from the outer side edge of the steel cord reinforcing layer, and effectively suppress the occurrence of cracks at the rubber elastic body, even if the side portion of the rubber elastic body protruding from the end of the core in the width direction is bent and deformed from the outer peripheral surface side to the inner peripheral surface side at the time of contacting with curbstone or the like, riding over a step, or the like. Second; since the covering thickness of the rubber elastic body is kept at a thicker shape from the outer side edge position of the steel cord reinforcing layer to the inner side portion in the width direction thereof, the surface on the outer peripheral surface side of the rubber elastic body can be sufficiently spaced away from the end edge of the core as well as the outer side edge of the steel cord reinforcing layer. Thus, even when the rubber elastic body is bent and deformed as described above, the rubber elastic body is effectively protected from the concentration of stress or strain against both the core and the steel cord reinforcing layer, and the occurrence of cracks at the rubber elastic body is effectively prevented.

Further, it is possible to further advantageously protect the rubber elastic body against the steel cord reinforcing layer, which is a rigid member, and further effectively prevent the occurrence of cracks at the rubber elastic body, in a case where the covering thickness of the rubber elastic body at the end portion of the core on the outer peripheral surface side, where the steel cord reinforcing layer extends, is made thicker, for example, by an amount of thickness corresponding to a distance from the outer peripheral surface of the core to the outer peripheral surface of the steel cord reinforcing layer, as compared with the covering thickness of the rubber elastic body at the end portion of the core on the inner peripheral surface side.

MODE FOR CARRYING OUT THE INVENTION

Hereinbelow, an embodiment of the present invention will be described with reference to the drawings.

Figure 1:
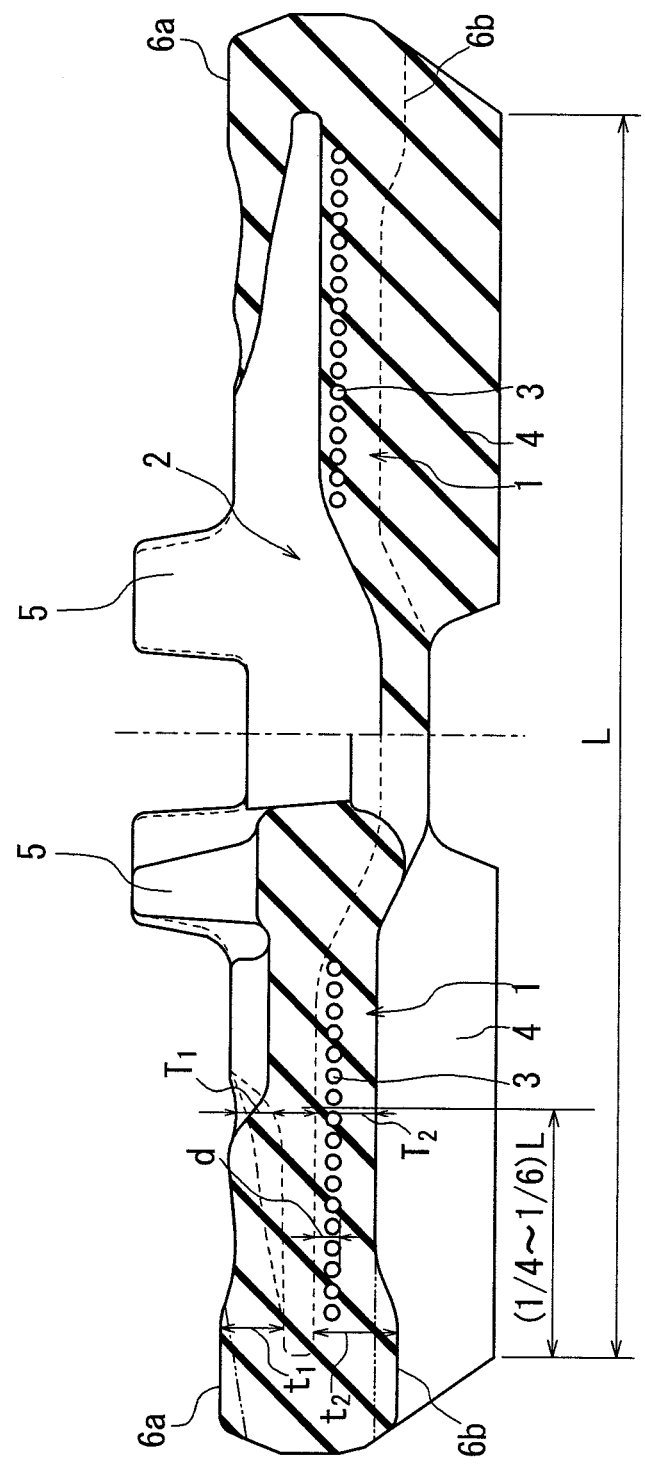
FIG. 1 is a sectional view in a width direction of a rubber track illustrating an embodiment of the present invention.
Figure 2:
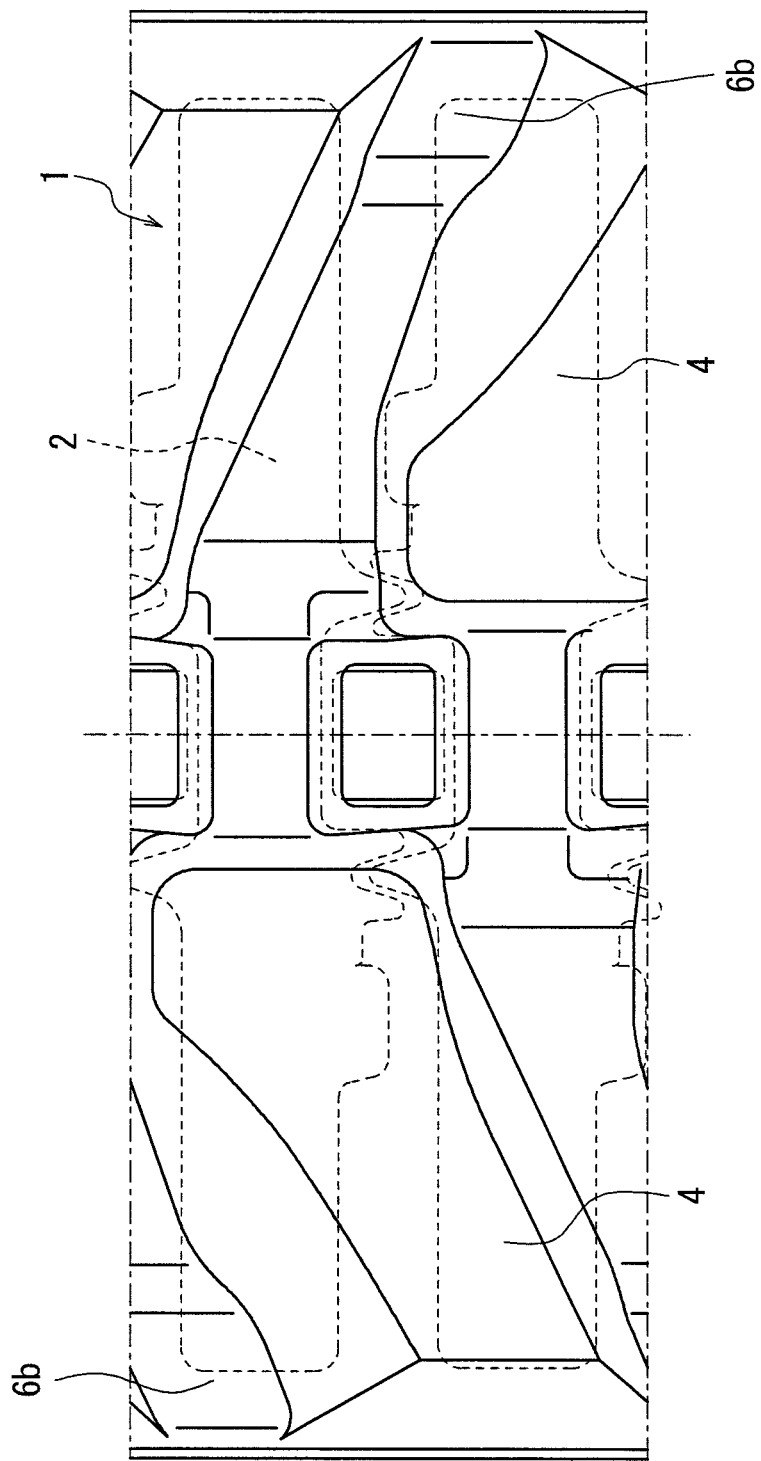
FIG. 2 is a developed plan view illustrating an outer peripheral surface side of the rubber track.
Figure 3:
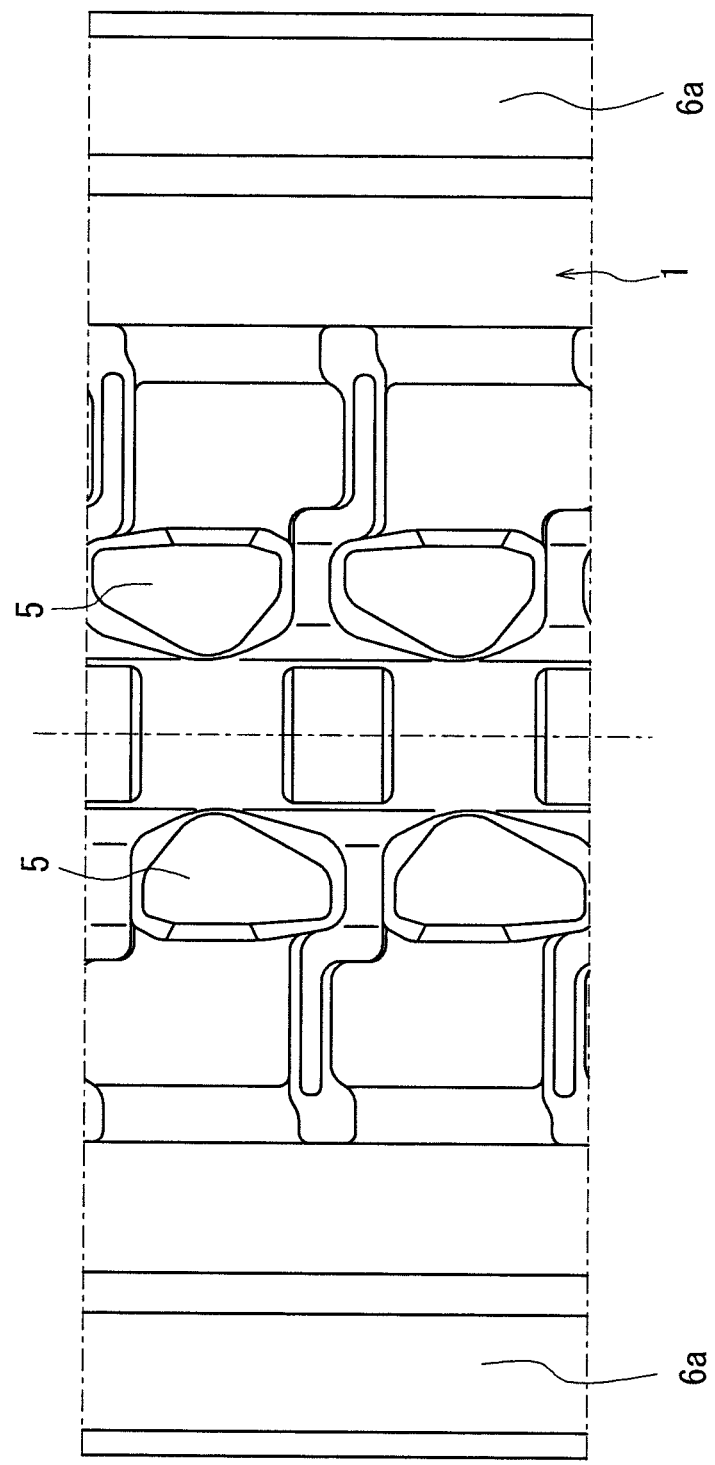
FIG. 3 is a developed plan view illustrating an inner peripheral surface side of the rubber track.

FIG. 1 is a sectional view in the width direction of a rubber track, and FIGS. 2 and 3 are developed plan views of the outer peripheral surface side and the inner peripheral surface side of the rubber track, respectively.

The rubber track is provided with a rubber elastic body 1 connecting endlessly in the circumferential direction. In the rubber elastic body 1, plural cores 2 are embedded and arranged at predetermined pitches so as to extend in the width direction of the rubber elastic body 1, and a steel cord reinforcing layer 3 surrounds the cores 2 and extends in the circumferential direction. Further, plural lugs 4 formed at predetermined intervals in the circumferential direction and acting on a road surface are provided to the rubber elastic body 1, thereby on the outer peripheral surface of the rubber track. On the inner peripheral surface thereof and between roller path surfaces, there are provided projections 5 that are engaged with idler tumblers (idlers) to apply tension to the rubber track for the purpose of maintaining a smooth travel.

Here, each of the end portions of the cores 2, for example, a region extending from an end edge of the core 2 to ¼-⅙ of a total length L of the core 2 are formed such that a thickness thereof gradually decreases toward the end edge of the core 2, or is constant up to the end edge of the core 2. Further, at an end portion of the core 2, that is, for example, a region extending from the end edge of the core to ½-⅓ of the above-described range, a covering thickness of the rubber elastic body 1 is formed thicker at portions between the lugs 4 on both the inner peripheral surface side and the outer peripheral surface side than those of the conventional technique shown by the imaginary line in FIG. 1. Also, a covering thicknesses t1, t2 of the rubber elastic body 1 at these regions are, for example, 1.2 to 2 times thicker, more preferably, 1.5 to 2 times thicker than covering thicknesses T1, T2 of the rubber elastic body 1 at a point located ¼ of the core length L from the end edge of the core.

The covering surfaces of thicker portions 6a, 6b of the rubber elastic body 1 that cover the inner peripheral surface side and the outer peripheral surface side of the end portion of the core as described above are formed into flat surfaces, and, more preferably, those flat surfaces are parallel to each other, in particular, are horizontal surfaces parallel to each other.

Figure 4:
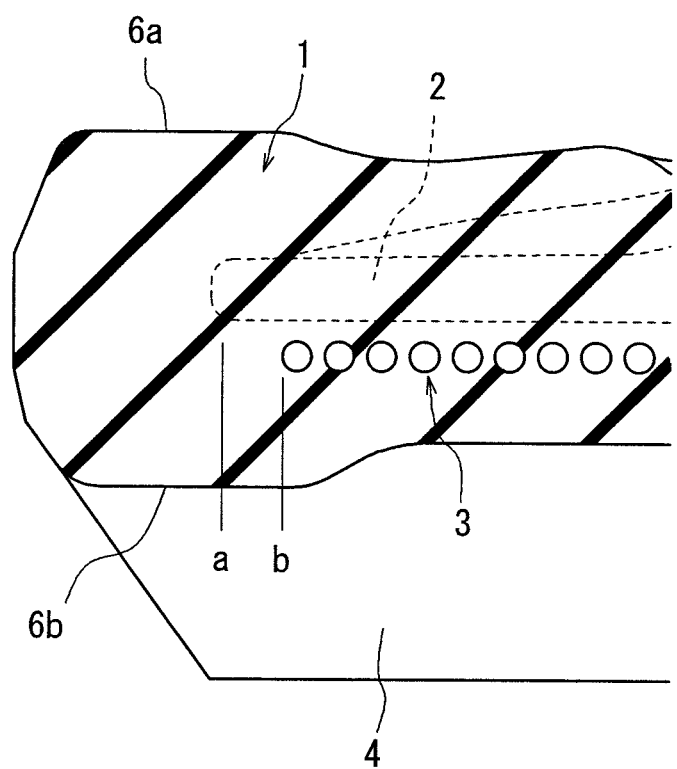
FIG. 4 is a partially enlarged sectional view in which a main portion of FIG. 1 is enlarged and illustrated; and, FIG. 5 shows a developed plan view and a sectional view in the width direction on the outer peripheral surface side of a half width of the rubber track of the proposed technique.

As can be clearly understood from FIG. 4 in which a main portion of FIG. 1 is enlarged and shown, in the rubber track shown in the drawings, an outer side edge of the steel cord reinforcing layer 3 extends and is disposed inside of a end edge position a of the core 2 in the width direction of the rubber track. Further, the covering thickness of the rubber elastic body 1 disposed at the end portion of the core on the outer peripheral surface side is formed so as to be constant up to an outer edge position b of the steel cord reinforcing layer 3 and to an inner side portion in the width direction of the steel cord reinforcing layer 3, and a thickness of the thicker portion 6b described above is made gradually decreased from a position further inside of the above-described inner side portion in the width direction thereof toward the inner side in the width direction thereof. With this configuration, a deformation reaction force or stress of the rubber elastic body 1 received from the outer side edge of the steel cord reinforcing layer 3 can be advantageously alleviated by the thicker portion 6b, when the rubber elastic body 1 is bent and deformed from the outer peripheral surface side to the inner peripheral surface side.

As for the thicker portion 6a of the rubber elastic body 1 covering the inner peripheral surface side of the end portion of the core, it is preferable that the thickness thereof be gradually decreased from a position inside of the end of the core in the width direction of the track, or, in a case where the end portion of the core has a protruding portion, inside of the highest position of the protruding portion in the width direction, for the purpose of preventing interference with a machine body without decreasing the crack resistance at the end of the core, and preventing the increase in the weight.

Incidentally, as for a relative thickness of the thicker portions 6a, 6b as described above, it is preferable that the covering thickness of the rubber elastic body 1 at the end portion of the core on the outer peripheral surface side, that is, the thickness of the thicker portion 6b be made thicker, for example, by an amount of thickness corresponding to a distance d from the outer peripheral surface of the core portion 2 to the outer peripheral surface of the steel cord reinforcing layer 3, as compared with the thickness of the thicker portion 6a. This makes it possible to further effectively protect the rubber elastic body 1 on the outer peripheral surface side of the end portion 2 of the core against the steel cord reinforcing layer 3 and the core 2, which are rigid members.

EXPLANATION OF REFERENCE NUMERALS

1 Rubber elastic body
2 Core
3 Steel cord reinforcing layer
4 Lug
5 Driving projection
6a, 6b Thicker portion
L Total length of core
t1, t2 Covering thickness
T1, T2 Covering thickness
a End edge position
b Outer edge position

The invention claimed is:

1. A rubber track having: an endless rubber elastic body; a plurality of cores arranged at predetermined pitches within the rubber elastic body so as to extend in a width direction of the rubber elastic body; a steel cord reinforcing layer surrounding the cores and extending in the rubber elastic body; and a lug formed on an outer peripheral surface of the rubber elastic body at predetermined intervals and acting on a road surface, wherein
   thicknesses of respective end portions of each of the cores are gradually decreased toward respective end edges of each of the cores, or are made constant up to the respective end edges of each of the cores;
   at each end portion of the core, a covering thickness of the rubber elastic body is formed thicker at a portion between lugs on each of an inner peripheral surface side and an outer peripheral surface side than a covering thickness of the rubber elastic body at a point located ¼ of a length of the core from an end edge position of the core; and,
   covering surfaces on both the inner peripheral surface side and the outer peripheral surface side are formed into flat surfaces from an end edge position of the core toward an outer side in the width direction of the rubber elastic body, wherein
   the covering thickness of the rubber elastic body on the outer peripheral surface side is constant from the end edge position of the core to just inside an outer edge position of the steel cord reinforcing layer in the width direction of the steel cord reinforcing layer, and the covering thickness gradually decreases from just inside the outer edge position.

2. The rubber track according to claim 1, wherein
   at the end portion of the core, the covering surfaces of the covering rubber elastic body at respective portions between the lugs on the inner peripheral surface side and the outer peripheral side are formed into parallel surfaces.

3. The rubber track according to claim 1, wherein
   the covering thickness of the rubber elastic body at the end portion of the core on the outer peripheral surface side is made thicker than the covering thickness of the rubber elastic body at the end portion of the core on the inner peripheral surface side.

* * * * *